Sept. 30, 1969   J. D. VAN BENTHUYSEN ET AL   3,469,311
METHOD OF MAKING AN ELECTRICAL CONTROL
Original Filed May 11, 1964                    2 Sheets-Sheet 1

INVENTORS
JOHN D Van BENTHUYSEN
WAYNE A. BARDEN
BY John J. Gaydos
ATTORNEY

Sept. 30, 1969  J. D. VAN BENTHUYSEN ET AL  3,469,311
METHOD OF MAKING AN ELECTRICAL CONTROL
Original Filed May 11, 1964                    2 Sheets-Sheet 2

INVENTORS
JOHN D. Van BENTHUYSEN
WAYNE A. BARDEN
BY John J. Gaydos
ATTORNEY

United States Patent Office 3,469,311
Patented Sept. 30, 1969

3,469,311
METHOD OF MAKING AN ELECTRICAL CONTROL
John D. Van Benthuysen and Wayne A. Barden, Elkhart, Ind., assignors to CTS Corporation, Elkhart, Ind., a corporation of Indiana
Original application May 11, 1964, Ser. No. 366,542, now Patent No. 3,375,478. Divided and this application Nov. 20, 1967, Ser. No. 684,451
Int. Cl. H01c 17/00
U.S. Cl. 29—620
10 Claims

ABSTRACT OF THE DISCLOSURE

A method of making a variable resistance control having a resistance element by positioning an electrically conductive bracket integral with a collector on one side of the resistance element, and a contactor on the other side of the resistance element. An electrically nonconductive heat-deformable shaft connected to a rotatable member is positioned in an aperture or bearing provided in the bracket. After properly positioning the parts of the control heat swaging of the shaft is effected, thereby increasing the diameter of the shaft, improving the fit between the shaft and a bearing therefor, and securing the shaft in the bearing with a portion of the rotatable member stabilizing the rotatable member relative to the resistance element. The method may further include nestedly disposing an equalizing contractor having a pair of arms in a space between the shaft and the portion of the rotatable member stabilizing the rotatable member relative to the resistance element.

---

Figure 1:
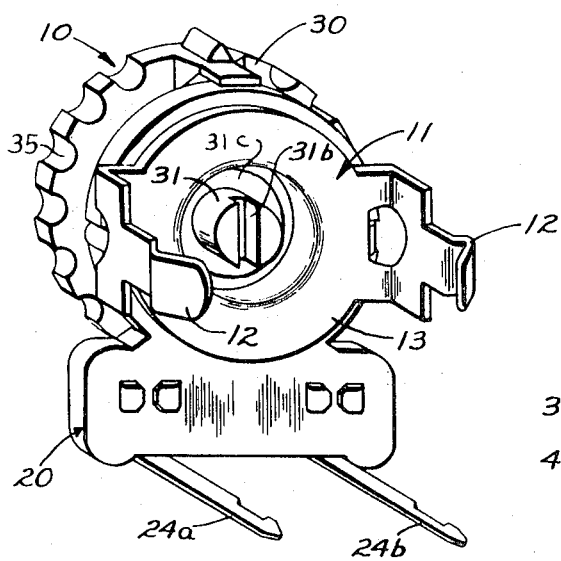

This is a division of application Ser. No. 366,542, filed May 11, 1964, now Patent No. 3,375,478. The present invention relates to electrical controls, and, more particularly, to a method of making a variable resistance control by positioning a bracket and collector on one side of a resistance element and a contactor on the other side of the resistance element.

Many of the variable resistance controls presently manufactured must meet many design and test requirements, for example, the shaft must be rotatable in a substantially wobbleless manner, and the fluid or lubricant in the bearing must not impose a substantial load upon the shaft at subnormal temperatures or flow out of the bearing at elevated temperatures. It is well known that several materials such as nylon are excellent bearing-forming materials since these materials need not be lubricated with a fluid. Consequently many shafts whether of brass, steel or the like are journaled in nylon bearings. Such construction, however, requires that the shafts usually be machined in order that the proper bearing fit be maintained. In recent years, the cost of some variable resistance controls has been decreased by making the shafts of an electrically nonconductive material such as nylon. An example of a nylon shaft construction is shown in the Zunker et al. Patent No. 3,032,734 dated May 1, 1962. Although the variable resistance controls with nylon shafts are primarily employed in equipment not requiring controls having close bearing fits, these controls would be further accepted and in greater demand if the bearing fit could be improved without substantially increasing the cost of the control. It would, therefore, be desirable to provide a new and improved method of making variable resistance control having a shaft closely fitted in a bearing.

Whenever the shaft rotatably supporting the contractor is loosely fitted in the bearing of the variable resistance control, many problems, e.g., wobbleness, occur. These problems become of greater concern as the size and the cost of the control are decreased. It would, therefore, be desirable to provide a method for properly fitting the shaft in the bearing during assembly and for preventing wobbleness of the rotatable member of the variable resistance control.

One of the most difficult requirements to obtain with a decrease in size of a variable resistance control is to maintain the proper rotational torque. Thrust washers and the like generally become ineffective because the washers are provided with standard manufacturing tolerances. Heretofore, whenever a nylon shaft has been used in the manufacture of a variable resistance control, the method of obtaining the proper rotational torque has been accomplished in the same manner as with metal shafts. It would, therefore, be desirable to provide improved means for maintaining the proper rotational torque by prestressing the nylon shaft during the process of assemblying the variable resistance control.

The conventional variable resistance control generally employs a rotatable contactor fixedly secured to the rotatable member, i.e., the driver. As the size of the control decreases, greater problems also are encountered in constraining the contactor to rotate with the driver. Moreover, the deviation in contact pressure of the contactor varies inversely with the size of the contactor since the contactor as well as the other parts of the control are made with standard manufacturing tolerances to maintain cost at a minimum. Thus there is a tendency for a greater differential in contact pressures to exist against the resistance element and the collector ring. It would, therefore, also be desirable to provide a method of making a variable resistance control having improved means for constraining a contactor to rotate with the driver and a contactor having means for equalizing the contact pressures in a preset ratio against the resistance element and the collector ring.

Accordingly, it is an object of the present invention to provide a new and improved method of making a variable resistance control having the various desirable features set forth above. Another object of the persent invention is to provide a method of making a variable resistance control with a shaft of an electrically nonconductive heat-deformable material, the method including the step of increasing the diameter of the shaft in a bearing supporting the shaft. An additional object of the present invention is to provide a method of providing the proper rotational torque and a method of improving the fit between a bearing and the shaft rotatable therein when assembling the variable resistance control. Further objects and advantages of the present invention will become apparent as the following description proceeds, and the features of novelty characterizing the invention will be pointed out with particularity in the claims annexed to and forming a part of this specification.

Briefly, the present invention is concerned with a method of making a variable resistance control comprising an electrically nonconductive heat-deformable shaft, e.g., of nylon, supported by a mounting bracket provided with an embossed annular member or collector having an apertured center portion. A base having an arcuate resistance element fixedly secured thereto with a pair of terminals securing the ends of the arcuate resistance element to the base is also provided with a centrally disposed opening, the inner edge thereof cooperating with the outer periphery of the collector for aligning the collector in concentric relationship with the arcuate resistance element. Suitable tabs are provided between the base and mounting bracket for preventing rotation therebetween. A rotatable member of electrically nonconductive heat-deformable material, such as nylon, is integrally secured to the shaft, and an annular ring spaced from the shaft provides an arcuate cavity nestedly supporting a contactor. The contactor received in the arcuate cavity is provided with a pair of diametrically opposed pivotal arms, and on opposite sides of the pair of pivotal arms is a pair of contacts, one of the contacts engaging the collector and the other contact engaging the arcuate resistance element. Thus, an increase in force upon one of the contacts of the contactor automatically increases the force upon the other contactor in a preset ratio thereby equilizing the forces applied thereagainst.

Figure 3:
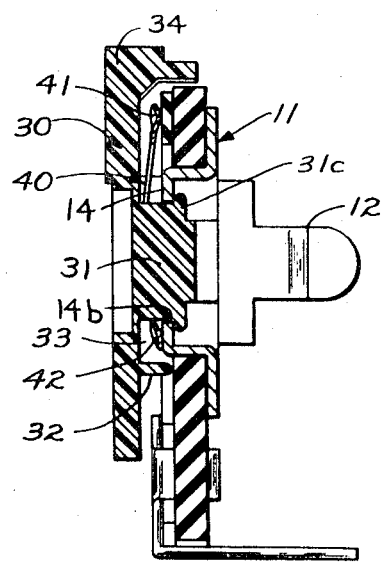
Figure 2:
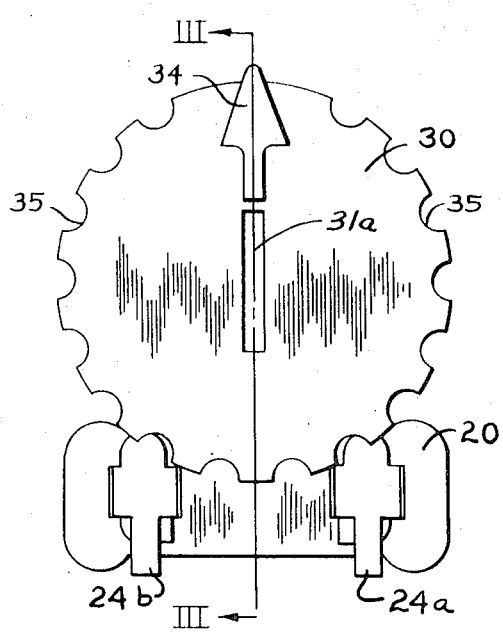
Figure 4:
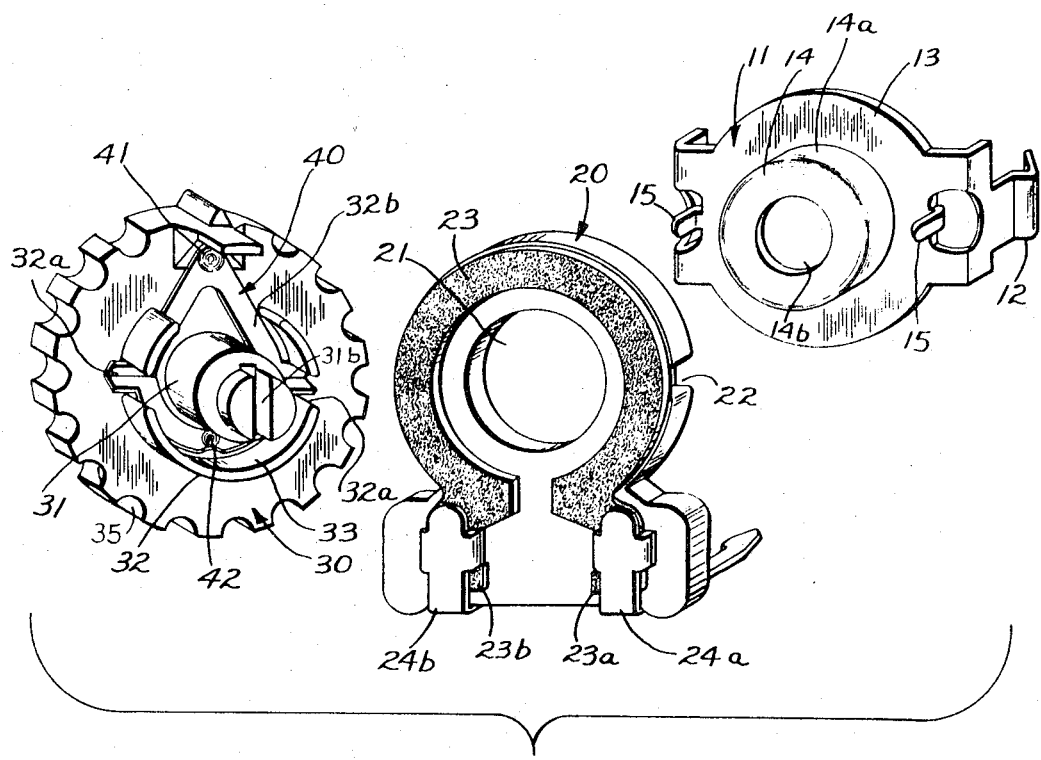
Figure 5:
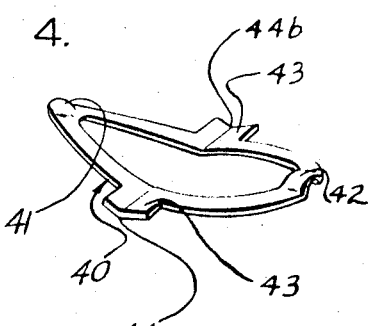
Figure 6:
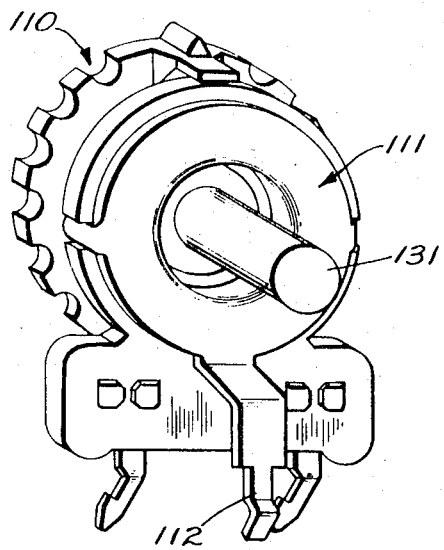

For a better understanding of the present invention, reference may be had to the accompanying drawings wherein the same reference numerals have been applied to like parts and wherein: FIGURE 1 is an isometric rear view of an improved variable resistance control built in accord with the present invention; FIGURE 2 is a front view of the variable resistance control shown in FIGURE 1, FIGURE 3 is a cross sectional view of the variable resistance control taken along lines III—III of FIGURE 2; FIGURE 4 is an exploded view of the variable resistance control shown in FIGURE 1; FIGURE 5 is an isometric view of the equalizing contactor for the variable resistance control of the present invention; and FIGURE 6 is another embodiment of a variable resistance control of the present invention.

Referring now to the drawings, there is illustrated a variable resistance control, generally indicated at 10, comprising a mounting bracket 11, a base 20, an electrically nonconducting heat-deformable rotatable member 30, and an equalizing contactor 40.

Considering first the mounting bracket 11, as best seen in FIGURES 1 and 4 of the drawings, it preferably comprises a one piece sheet metal stamping having a pair of snap-in fingers 12 extending rearwardly from a flat center portion 13 for quickly mounting and electrically connecting a portion of the variable resistance control 10 to a panel or the like. A collector ring 14 is embossed from the flat center portion 13 and extends inwardly thereof, the outer periphery 14a of the collector ring being positioned in an opening 21 of the base 20 for aligning the base 20 in concentric relationship with the collector ring 14. The collector ring 14 preferably projects into the opening 21 slightly greater than the thickness of the base 20 (see FIGURES 3). It is to be understood, however, that the depth of projection is not critical so long as the collector ring 14 is centered in the opening 21 by the outer periphery 14a.

For the purpose of preventing relative rotation between the base 20 and the mounting bracket 11, a pair of inwardly extending tabs 15 are disposed on opposite sides of the flat center portion 13 and engages notches 22 in the base. The tabs 15 are integral with the mounting bracket and preferably are punched out of the flat center portion 13 thereof.

As best illustrated in FIGURE 4 of the drawings, an arcuate resistance element 23 provided with a pair of depending legs 23a and 23b is fixedly mounted to the base 20 with a pair of terminals 24a and 24b in a suitable manner well known in the art. When the resistance element is of a carbon composition, the base generally is punched from an electrically nonconductive material such as laminated plastic; however, a base or substrate of ceramic material may be employed whenever higher temperature resistance elements are preferred and the roatable member 30 may be journaled in an aperture in the substrate. The ends of the terminals 24a and 24b may extend rearwardly of the base as shown in FIGURES 1, 3 and 4 of the drawings, the disposition thereof depending upon the location of the mounting panel.

In a device built in accord with the present invention, the rotatable member 30 preferably is molded of an electrically nonconductive heat-deformable material such as nylon. For rotatably supporting the member 30 with respect to the base 20, a shaft or spindle 31 extends inwardly of the rotatable member 30 and is journaled in the aperture 14b provided in the collector ring 14. With the above-described arrangement, the rotatable member 30 is readily assembled to the mounting bracket 11 by merely inserting the end of the shaft 31 into the aperture 14b of the collector ring 14 and heat swaging the end of the shaft projecting outwardly from the collector ring 14 as shown in FIGURES 1 and 3 of the drawings. Thus the collector ring 14 not only rotatably supports the shaft 31 extending inwardly from the rotatable member 30 but also centers the base 20 and the resistance element 23 with respect to the rotatable member 30. A suitable heated cylindrical tool having an apertured bore is employed for swaging the outer periphery of the shaft against the rear surface of the collector ring to form an enlarged portion 31c, and simultaneously the swaging operation increases the diameter of the shaft disposed in the aperture 14b of the collector ring 14. Such design assures a tight bearing fit between the shaft 31 and the bearing or aperture 14b as well as eliminating longitudinal movement of the shaft. Whenever the control 10 is adjusted frequently, the inner edge of the collector ring defining the aperture 14b is widened to increase the surface area of the bearing.

It will be appreciated that as the size of the control is decreased greater problems are encountered in securing the contactor to the rotatable member 30 and in constraining the contactor 40 to rotate with the rotatable member 30. The arrangement for accomplishing this will be descirbed in detail hereinafter. As best shown in FIGURE 4 of the drawings, extending rearwardly from the inner surface of the rotatable member 30 is an arcuate member or annular ring 32 integral with the member 30, the outer edge or peripheral lip of the annular ring 32 engaging the portion of the base 20 (see FIGURE 3) adjacent to and circumposing the outer periphery of the collector ring 14. The variable resistance control 10 is thereby provided with two bearing surfaces, the first bearing surface being the surface of the aperture 14b supporting the shaft 31 and the second bearing surface being the outer edge of the annular ring 32. The first bearing surface aligns the contactor 40 with the resistance element 23 and the collector ring 14 when the rotatable member 30 is rotated with respect to the base 20, and the second bearing surface stabilizes the rotatable member 30 and thus prevents wobbleness when the rotatable member is rotated.

Preferably and as illustrated in FIGURE 4 of the drawings, the contactor 40 having a pair of contacts 41 and 42 is nestedly received in an annular cavity 33 formed by the shaft 31 and the inner surface of the annular ring 32. The contact 41 is disposed at greater distance from the axis of the shaft 31 than the contact 42 of the contactor 40 for making electrical engagement with the arcuate resistance element 23 and the contact 42 engages the collector ring 14. The distance from the contacts 41 and 42 to the axis of the shaft also determines the ratio of the contact pressures. To constrain the contactor 40 to rotate with the rotatable member 30, the annular ring 32 is provided with a pair of slots 32a receiving a pair of outwardly extending diametrically opposite arms 43 integrally connected to the contactor 40. The annular ring 32 is also provided with a slot 32b for receiving the portion of the contactor 40 carrying the contact 41. The arms 43 of the contactor 40 are preformed into a V cross-section by forming a crease extending through both arms as shown in FIGURE 5 of the drawings, and the bottom edge of of the V forms pivot edges 44a and 44b for pivotal movement of the contactor. Therefore, any manufacturing tolerances resulting in the angle that the contactor is creased or should any differences in tolerances or thickness occur so as to vary the dimension between the top surface of the collector ring and the arcuate resistance element, the contact pressures thereagainst will be balanced in a preset ratio since the contactor 40 will merely pivot on pivot edges 44a and 44b.

From the above description it is apparent that the variable resistance control 10 can be rapidly assembled in production. For example, the rotatable member 30 is carried by a movable supporting surface and a contactor 40 is automatically assembled to the rotatable member 30 by merely dropping the contactor 40 over the shaft 31 with the arms 43 of the contactor in alignment with the slots 32a. The mounting bracket 11 is then assembled to the base 20 with the arcuate resistance element 23 facing the rotatable member 30. After the base 20 and mounting bracket 11 are assembled in position on the shaft 31, it is merely necessary to compress the parts together and heat swage the outer peripheral portion of the shaft to secure the mounting bracket to the rotatable member 30. By heat swaging only the outer periphery of the shaft as shown in FIGURES 1 and 3, the rotatable member may still be rotated by inserting a tool in the slot 31b provided in the distal end of the shaft. Simultaneously, during the heat swaging operation, the force of the heat swaging tool increases the diameter of the shaft within the aperture 14b for improving the fit between the shaft and the bearing. Whenever it is desired to increase the rotational torque of the variable resistance control 10, it is merely necessary to provide a button or raised portion in the center of the surface supporting the rotatable member 30 for urging the shaft 31 further into the aperture 14b of the collector ring 14. Since the button engages only the center portion of the rotatable member 30, the peripheral edge of the rotatable member 30 is forced downwardly due to the pivotal action of the annular ring 32 and forms the rotatable member 30 into a dished or concave construction encircling the button, such construction developing a prestressed condition in the shaft after final assembly. By controlling the thickness of the button, the rotational torque may be readily controlled. After the enlarged portion 31c of the shaft 31 cools sufficiently, the force compressing the parts together is released.

In order that the variable resistance control 10 can be rotated from either the front or rear thereof, a slot 31a (see FIGURE 2) is provided on the front surface thereof in addition to the slot 31b provided in the rear end of the shaft (see FIGURES 1 and 4). An arrow 34 is provided on the front face of the rotatable member 30 to indicate the angular position of the contactor, i.e., to indicate the amount of resistance in or out of the circuit. A plurality of undulations 35 is provided in the periphery of the rotatable member to facilitate rotation thereof without a tool.

An additional embodiment of the invention is shown in FIGURE 6 of the drawings, the variable resistance control 110 being substantially the same as the variable resistance control 10 shown in FIGURES 1–4 of the drawings. The main difference is that the shaft 131 extends rearwardly sufficiently so as to provide means for securing a knob or the like to the shaft of the control. Further, the mounting bracket 111 is provided with a depending terminal 112 instead of a pair of rearwardly extending terminals for mounting the variable resistor to a horizontally disposed mounting plate instead of a vertically disposed mounting plate.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A method of making a variable resistance control comprising the steps of:
   (a) positioning a contactor onto an electrically nonconductive heat-deformable rotatable member around a shaft projecting from the member to constrain the contactor to rotate with the rotatable member,
   (b) placing an aperture base assembly having an arcuate resistance element fixedly secured thereto against the rotatable member,
   (c) inserting the heat-deformable shaft into the aperture provided in the base assembly, and
   (d) heat swaging the end of the shaft to increase the diameter of the shaft in the aperture of the base assembly and a portion of the diameter of the shaft projecting beyond the base assembly.

2. The method of claim 1 comprising the additional step of dishing the rotatable member while the shaft is being heat swaged to prestress the shaft.

3. A method of making a variable resistance control comprising the steps of:
   (a) providing a rotatable member with an upstanding shaft of electrically nonconductive heat-deformable material,
   (b) mounting an equalizing contactor on the rotatable member and constraining the contactor to rotate with the member,
   (c) centering an apertured base having an arcuate resistance element fixedly secured thereto over the heat-deformable shaft,
   (d) attaching an apertured mounting bracket to the base,
   (e) inserting the heat-deformable shaft into the apertured mounting bracket,
   (f) compressing the mounting bracket against the rotatable member to project the end of the shaft beyond the outer face of the mounting bracket,
   (g) heat swaging the outer periphery of the end of the shaft to increase the diameter of the shaft in the aperture of the mounting bracket and a portion of the diameter of the shaft projecting beyond the mounting bracket,
   (h) cooling the shaft to maintain the variable resistance control in assembled position, and
   (i) releasing the pressure compressing the mounting bracket against the rotatable member.

4. A method of making a variable resistance control comprising the steps of:
   (a) positioning a contactor having an aperture therein adjacent one side of an apertured base assembly having an arcuate resistance element fixedly secured to said one side thereof and an apertured collector secured to the other side thereof,
   (b) inserting the shaft of a heat-deformable member through the apertures in the collector, contactor, and base assembly, and
   (c) heat swaging the end of the shaft to increase the diameter of the shaft in the aperture of the collector and a portion of the diameter of the shaft projecting beyond the collector thereby to secure assembly of the control with the shaft and heat deformable member holding the contactor, collector, and base assembly in assembled relationship.

5. A method of making a variable resistance control comprising the steps of:
   (a) positioning a contactor having an aperture therein adjacent one side of a resistance element provided with an opening and positioning an apertured collector on the other side thereof,
   (b) aligning the aperture of the contactor with the opening in the resistance element,
   (c) maintaining alignment between the aperture of the contactor and the opening in the resistance element,
   (d) aliging a deformable shaft of a rotatable member with the aperture in the contactor and the opening in the resistance element.
   (e) inserting the deformable shaft of the rotatable member through the aperture in the collector, the aperture in the contactor, and the opening in the resistance element, (f) softening the end of the deformable shaft to facilitate deformation of the end of the shaft, and (g) increasing the size of the end of the shaft by deforming the softened end portion thereof thereby to secure assembly of the control with the deformable shaft and rotatable member holding the contactor, collector, and resistance element in assembled relationship.

6. The method of claim 5 wherein the step of positioning the apertured collector on the other side of the resistance element includes the step of interlocking the collector with the resistance element.

7. A method of making a variable resistance control comprising the steps of:

(a) positioning a rotatable member having a deformable shaft onto a supporting surface with the shaft extending upwardly, (b) positioning a contactor at least partially around the shaft and constraining the contactor to rotate with the rotatable member, (c) placing a resistance element provided with an opening over the rotatable member with the front face of the resistance element engaging the contactor, (d) positioning a collector provided with an aperture against the rear face of the resistance element, (e) aligning the collector with the resistance element and the shaft, (f) compressing the rotatable member toward the collector to maintain the resistance element against the collector and to locate the shaft in the aperture of the collector with the end portion of the shaft extending beyond the collector, (g) softening and spreading laterally outwardly the end portion of the shaft, and (h) holding the collector compressed against the rotatable member until the end portion of the shaft has hardened to produce an assembled control.

8. The method of claim 7 comprising the additional step of positioning the contactor in an arcuate cavity defined by a portion of the shaft and an arcuate skirt integral with the rotatable member and extending upwardly in the same direction as the shaft and spaced from the shaft, the arcuate skirt being provided with means for constraining the contactor to rotate with the rotatable member.

9. The method of claim 8 comprising the addition step of dishing the rotatable member toward the resistance element when compressing the rotatable member toward the collector to alter the rotational force necessary to rotate the rotatable member with respect to the resistance element.

10. The method of claim 7 comprising the additional step of increasing the cross section of the portion of the shaft in the aperture of the collector while softening the end portion of the shaft to improve the fit between the shaft and the collector.

References Cited

UNITED STATES PATENTS

| | | | |
|---|---|---|---|
| 2,946,032 | 7/1960 | Daily | 338—174 |
| 3,032,734 | 5/1962 | Zunker et al. | 338—163 |

FOREIGN PATENTS

| | | |
|---|---|---|
| 614,983 | 1/1961 | Italy. |

JOHN F. CAMPBELL, Primary Examiner

J. L. CLINE, Assistant Examiner.